(12) United States Patent
Hatanaka et al.

(10) Patent No.: US 12,030,362 B1
(45) Date of Patent: Jul. 9, 2024

(54) SUSPENSION AND OFF-ROAD VEHICLE

(71) Applicant: KAWASAKI MOTORS, LTD., Hyogo (JP)

(72) Inventors: Tatsuya Hatanaka, Akashi (JP); Takashi Hisamura, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 18/089,628

(22) Filed: Dec. 28, 2022

(51) Int. Cl.
*B60G 3/14* (2006.01)
*B60G 7/00* (2006.01)
*B60G 15/06* (2006.01)

(52) U.S. Cl.
CPC ............... *B60G 3/14* (2013.01); *B60G 7/001* (2013.01); *B60G 15/067* (2013.01); *B60G 2200/132* (2013.01); *B60G 2204/129* (2013.01); *B60G 2300/07* (2013.01)

(58) Field of Classification Search
CPC ........ B60G 3/14; B60G 7/001; B60G 15/067; B60G 2200/132; B60G 2204/129; B60G 2300/07
See application file for complete search history.

(56) References Cited

U.S. PATENT DOCUMENTS

| | | | | |
|---|---|---|---|---|
| 8,764,039 | B2 * | 7/2014 | Keller | B60G 21/0551 280/124.128 |
| 2009/0072505 | A1 * | 3/2009 | McGinnis | B60G 9/003 280/124.116 |
| 2013/0277937 | A1 * | 10/2013 | Keller | B60G 3/202 280/124.128 |
| 2022/0032702 | A1 * | 2/2022 | Gordon | B60G 7/001 |

FOREIGN PATENT DOCUMENTS

CN 106627011 A * 5/2017 ............... B60G 3/14

OTHER PUBLICATIONS

CN-106627011-A Machine English tranlation (Year: 2017).*
CN 106627011 A Machine translation (Year: 2017).*

* cited by examiner

*Primary Examiner* — Jason D Shanske
*Assistant Examiner* — Matthew James O'Neill
(74) *Attorney, Agent, or Firm* — XSENSUS LLP

(57) ABSTRACT

A suspension includes a trailing arm that is swingably attached to a vehicle frame of a utility vehicle and carries a wheel, and a shock absorber that connects the trailing arm and the vehicle frame. A first end, which is an end of the shock absorber, is attached to a side surface of the trailing arm facing inside in a width direction of the vehicle.

10 Claims, 7 Drawing Sheets

SUSPENSION AND OFF-ROAD VEHICLE

FIELD

The present disclosure relates to a suspension and an off-road vehicle.

BACKGROUND

Patent Document 1 (U.S. Pat. No. 8,764,039) discloses a suspension for a vehicle. The suspension includes a trailing arm that is rotatably connected to a chassis and carries a wheel, and a shock absorber that connects the chassis and the trailing arm.

SUMMARY

A shock absorber as disclosed by Patent Document 1 may come into contact with an obstacle when the vehicle is running.

In view of this point, the present disclosure has been made to reduce the contact between the shock absorber and the obstacle.

A suspension disclosed herein includes a trailing arm that is swingably attached to a vehicle frame of an off-road vehicle and carries a wheel, and a shock absorber that connects the trailing arm and the vehicle frame. A first end, which is an end of the shock absorber, is attached to a side surface of the trailing arm facing inside in a width direction of the vehicle.

An off-road vehicle disclosed herein includes a vehicle frame, a wheel, a trailing arm that is swingably attached to the vehicle frame and carries the wheel, and a shock absorber that connects a side surface of the trailing arm facing inside in a width direction of the vehicle and the vehicle frame.

The suspension of the present disclosure can reduce contact between the shock absorber and an obstacle.

The off-road vehicle of the present disclosure can reduce contact between the shock absorber and an obstacle.

DESCRIPTION OF EMBODIMENTS

Figure 1:
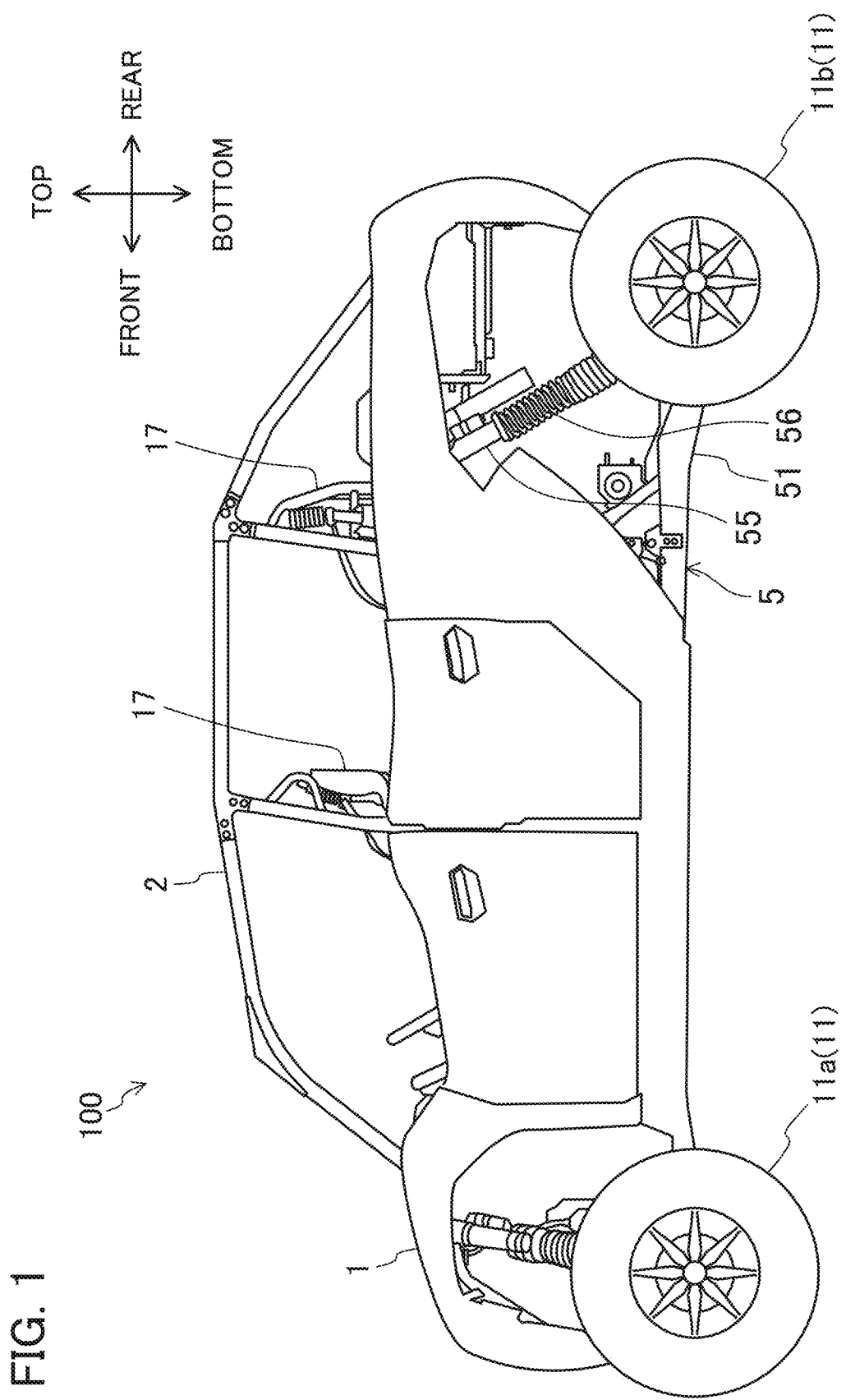
FIG. 1 is a side view of a utility vehicle.

Exemplary embodiments will be described in detail below with reference to the drawings. FIG. 1 is a side view of a utility vehicle 100. The utility vehicle 100 is able to travel off-road. The utility vehicle 100 is an example of an off-road vehicle.

In the present disclosure, components of the utility vehicle 100 will be described by way of directions relative to the utility vehicle 100. Specifically, in the present disclosure, the term "front" means the front side of the utility vehicle 100. The same applies to the terms "rear," "left," "right," "top," "upper," "below," and "lower." For convenience's sake, a left-right direction may also be referred to as a "vehicle width direction."

The utility vehicle 100 includes a body 1, a vehicle frame 2, wheels 11, seats 17 that passengers take, and suspensions 5.

The wheels 11 include left and right front wheels 11a and left and right rear wheels 11b. The utility vehicle 100 is a four-wheel vehicle. The front and rear wheels 11a and 11b may be collectively referred to as "wheels 11" when no distinction between the front and rear wheels is required. In this example, the seats 17 include a front seat and a rear seat. The suspensions 5 buffer impact and vibration transmitted from the wheels 11 to the vehicle frame 2. In this example, the suspensions 5 are rear suspensions that suspend the rear wheels 11b. The suspensions 5 are respectively provided on the left and right sides of the vehicle frame 2.

Figure 2:
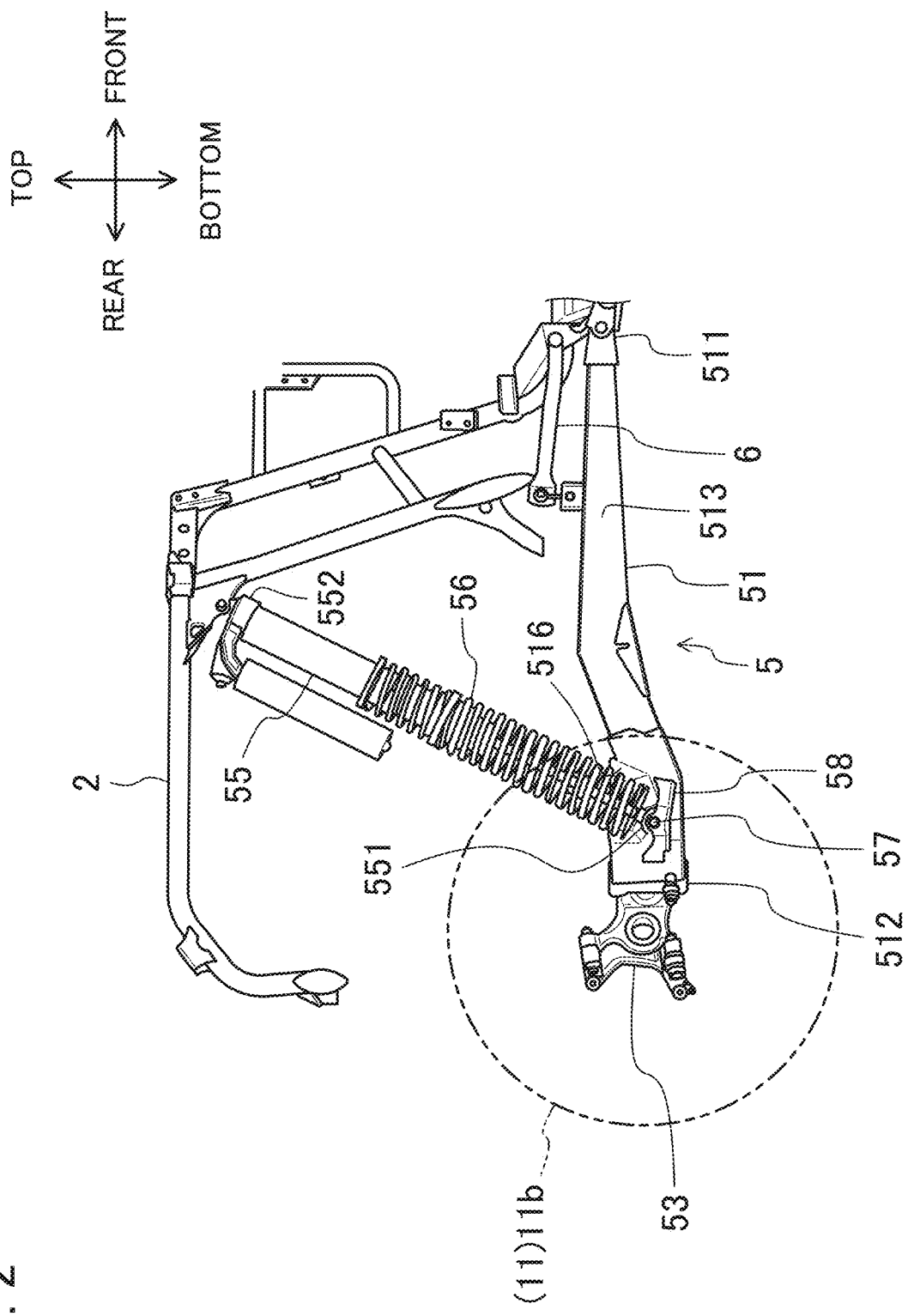
FIG. 2 is a side view illustrating part of a vehicle frame and a suspension as observed from the inside of the vehicle in a width direction.
Figure 3:
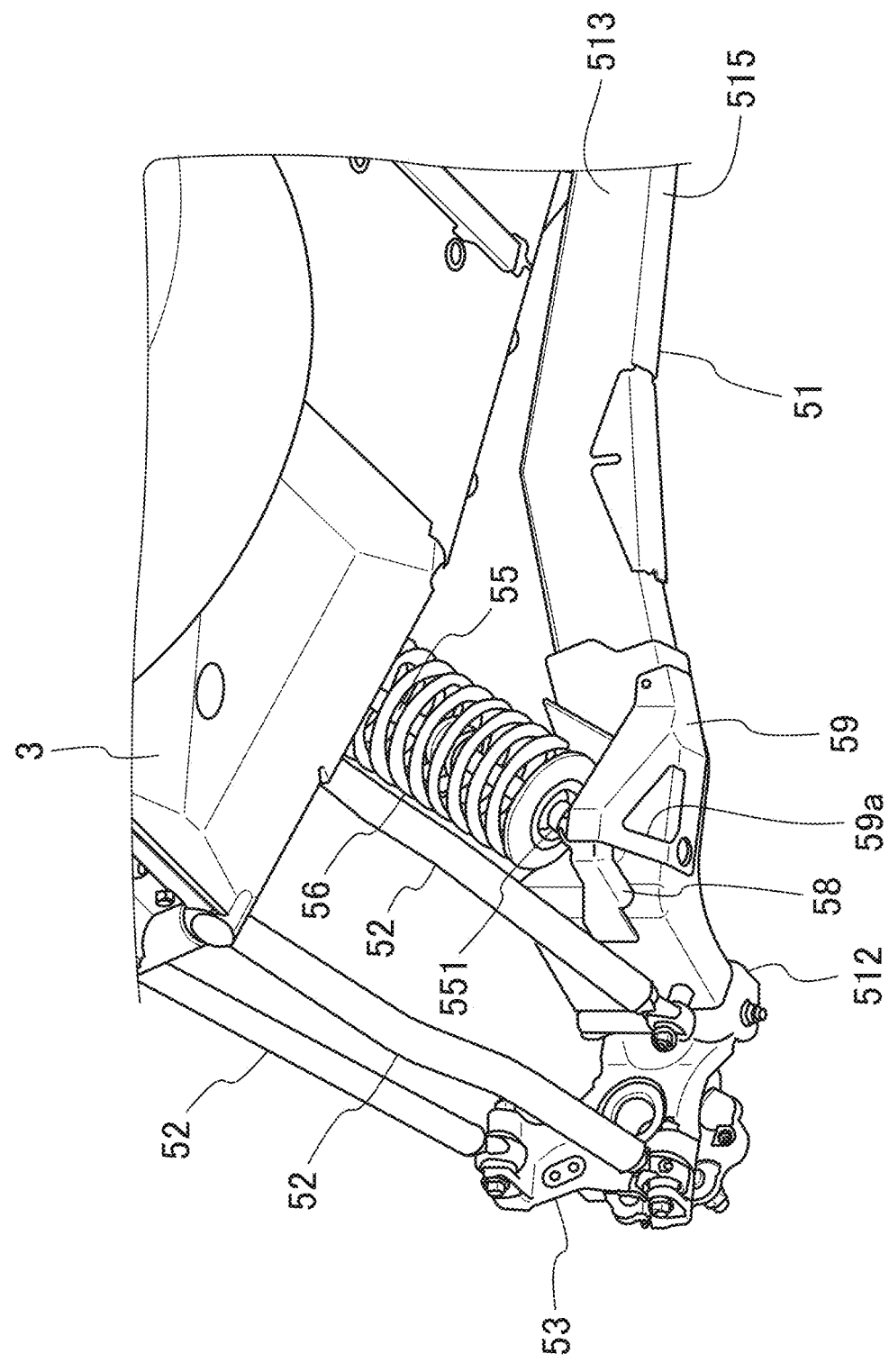
FIG. 3 is a perspective view illustrating a connection between a shock absorber and a trailing arm as observed from obliquely below.
Figure 4:
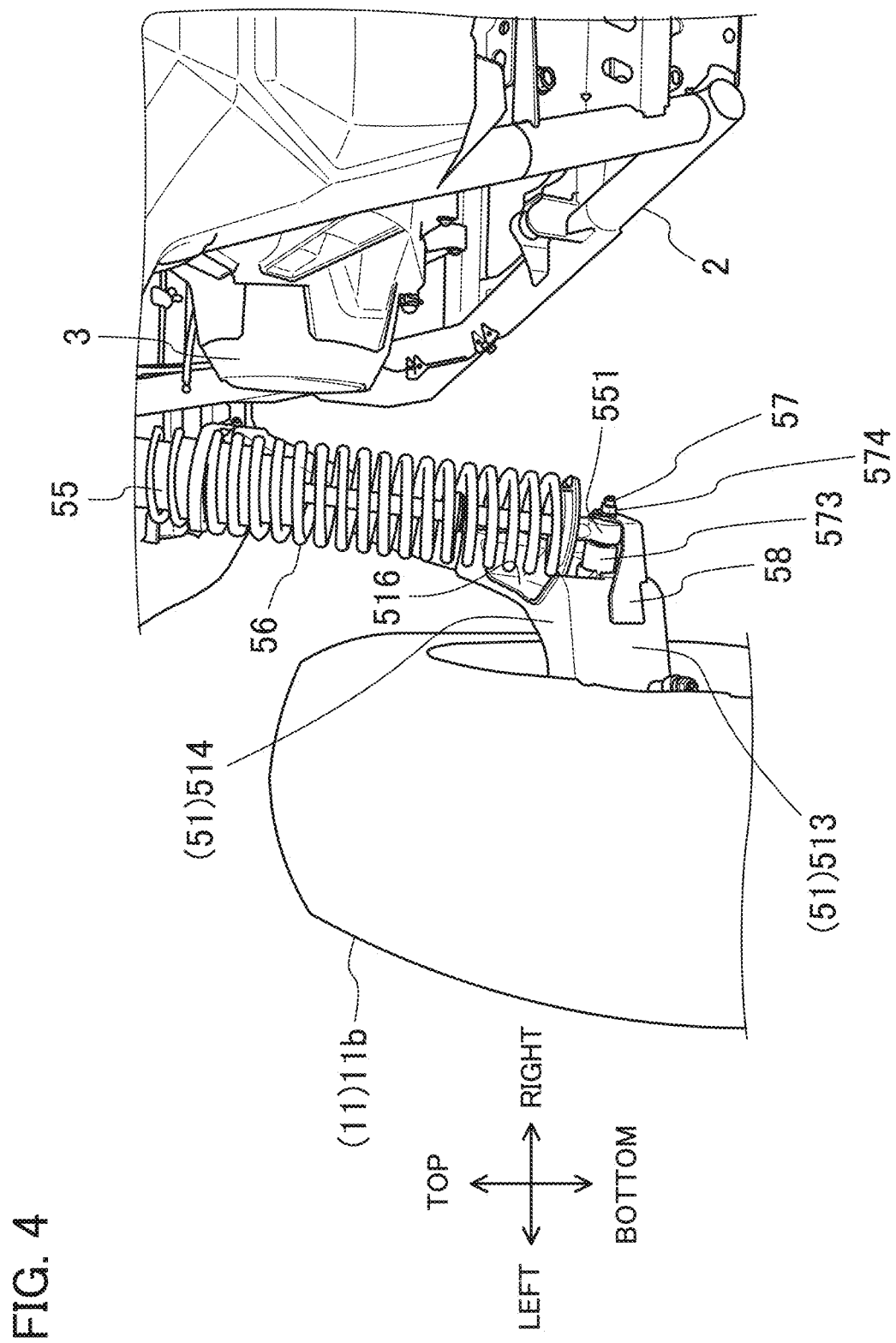
FIG. 4 is a back view illustrating the connection between the shock absorber and the trailing arm.
Figure 5:
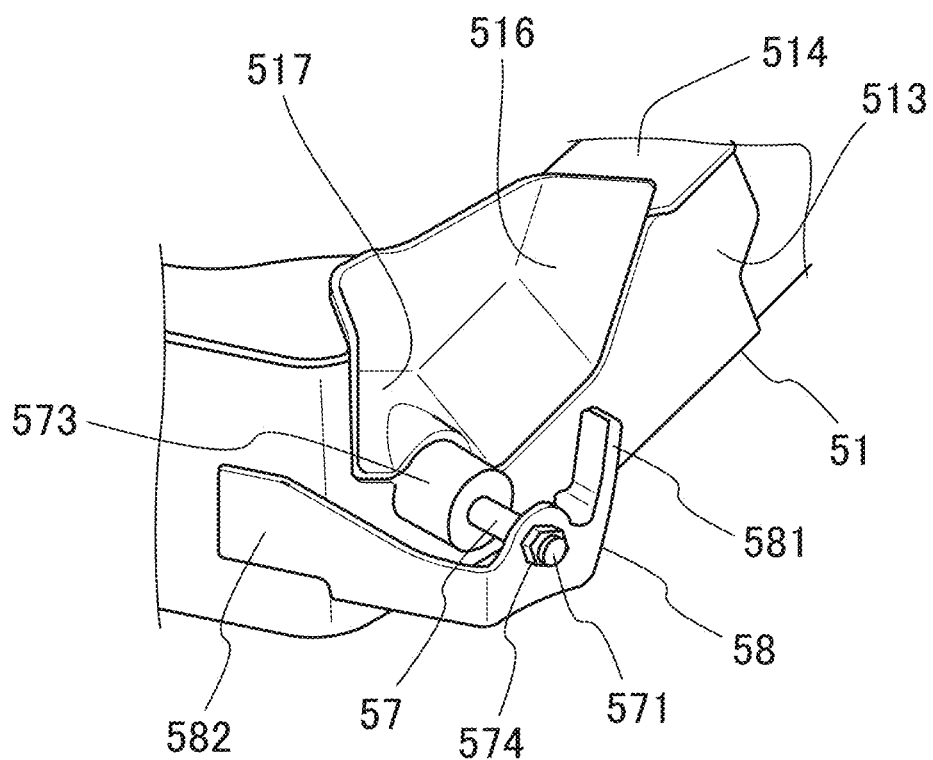
FIG. 5 is a perspective view illustrating part of the trailing arm connected to the shock absorber as observed from the inside of the vehicle in the width direction.
Figure 6:
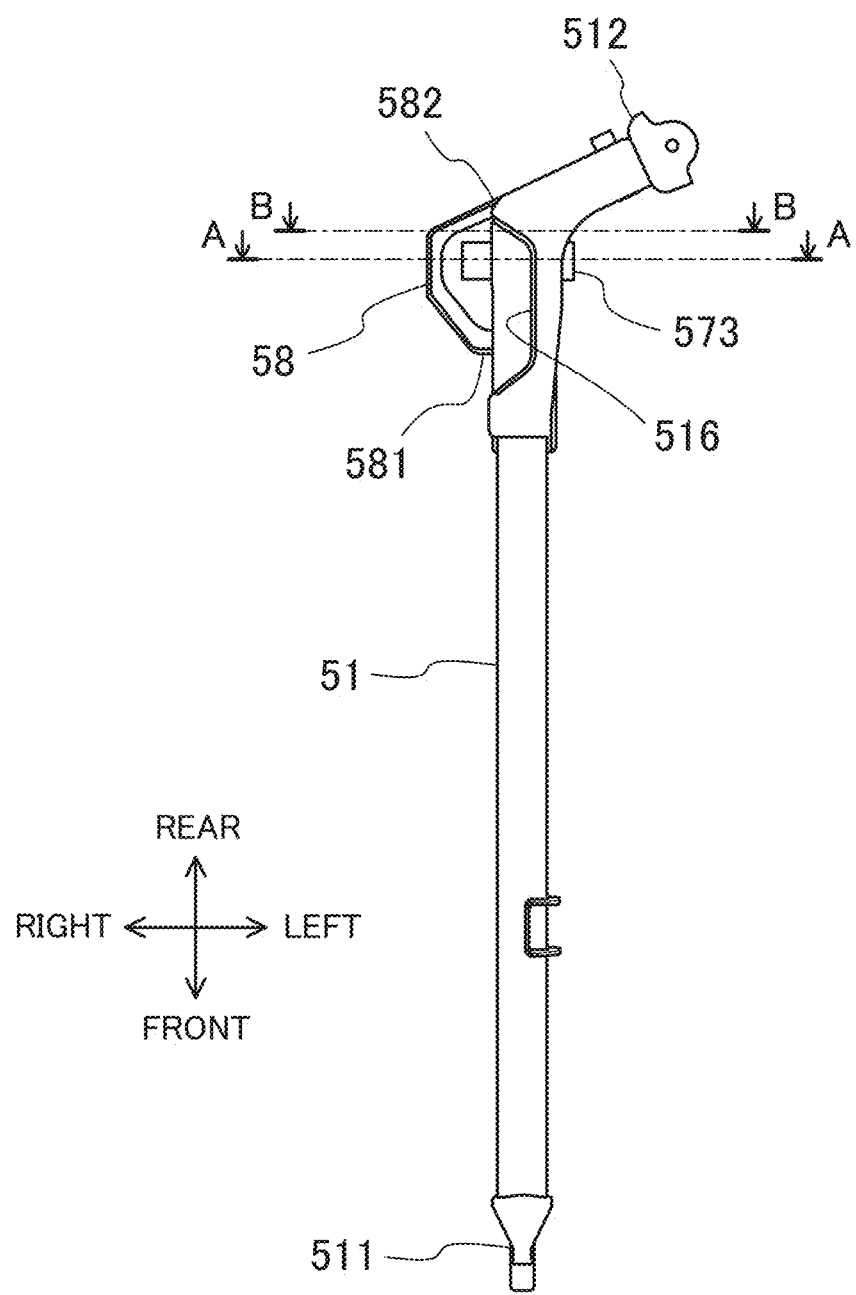
FIG. 6 is a plan view illustrating the trailing arm.

Components of each suspension 5 will be described in detail below. FIG. 2 is a side view illustrating part of the vehicle frame 2 and the suspension 5 as observed from the inside of the vehicle in the width direction. FIG. 3 is a perspective view illustrating a connection between a shock absorber 55 and a trailing arm 51 as observed from diagonally below. FIG. 4 is a back view illustrating the connection between the shock absorber 55 and the trailing arm 51. FIG. 5 is a perspective view illustrating part of the trailing arm 51 connected to the shock absorber 55 as observed from the inside of the vehicle in the width direction. FIG. 6 is a plan view illustrating the trailing arm 51.

The suspension 5 is an independent suspension. Specifically, the left and right suspensions 5 independently suspend the left and right rear wheels 11b. Each suspension 5 includes the trailing arm 51 that is swingably attached to the vehicle frame 2 and carries the wheel 11, and the shock absorber 55 that connects the trailing arm 51 and the vehicle frame 2. The suspension 5 further includes a plurality of lateral links 52 and a spring 56. The trailing arm 51 and the lateral links 52 support the rear wheel 11b to be movable up and down.

The trailing arm 51 determines the position of the rear wheel 11b in a front-rear direction. The lateral links 52 determine the position of the rear wheel 11b in the left-right direction. The trailing arm 51 and the lateral links 52 support a knuckle 53. The rear wheel 11b is rotatably attached to the knuckle 53.

The trailing arm 51 extends substantially in the front-rear direction. A first end 511, which is a front end of the trailing arm 51, is swingably connected to the vehicle frame 2. A second end 512, which is a rear end of the trailing arm 51, is connected to the knuckle 53. Specifically, the trailing arm 51 is connected to the vehicle frame 2 to be able to swing about an axis extending substantially in the left-right direction. The trailing arm 51 is able to swing relative to the vehicle frame 2 so that the knuckle 53 substantially moves up and down.

The lateral links 52 extend outward in the vehicle width direction from the vehicle frame 2. In this example, the suspension 5 includes three lateral rinks 52. An end of each lateral link 52 is connected to the vehicle frame 2 to be able to rotate about an axis extending substantially in the front-rear direction. The other end of each lateral link 52 is connected to the knuckle 53 to be able to rotate about an axis extending substantially in the front-rear direction. The lateral links 52 are able to swing relative to the vehicle frame 2 so that the knuckle 53 substantially moves up and down.

Thus, the knuckle 53 is supported by the trailing arm 51 and the lateral links 52 to be able to substantially move up and down. The suspension 5 further includes a stabilizer bar 6 that keeps the utility vehicle 100 from rolling. The stabilizer bar 6 is a rear stabilizer bar that connects the left and right trailing arms 51.

The spring 56 absorbs impact that the rear wheel 11b receives from the road surface. The shock absorber 55 damps the swing of the spring 56, i.e., the vibration of the spring 56, generated when the spring 56 absorbs the impact. The shock absorber 55 may be, for example, an air cylinder or a hydraulic cylinder. The spring 56 is a coil spring wound about the shock absorber 55. That is, the spring 56 elastically connects the vehicle frame 2 and the trailing arm 51.

The shock absorber 55, which is arranged to extend substantially in the vertical direction, is connected to the vehicle frame 11 and the trailing arm 51. That is, a first end 551, which is a lower end of the shock absorber 55, is connected to the trailing arm 51, and a second end 552, which is an upper end of the shock absorber 55, is connected to the vehicle frame 2.

Specifically, the first end 551 of the shock absorber 55 is attached to a side surface 513 of the trailing arm 51 facing inside in the vehicle width direction. This can make the shock absorber 55 less contact with an obstacle than, for example, when the shock absorber 55 is attached to a side surface of the trailing arm 51 facing outside in the vehicle width direction. In particular, the first end 551, which is not exposed outside in the vehicle width direction, can be kept from making contact with an obstacle on the outside in the vehicle width direction.

More specifically, the suspension 5 further includes a shaft 57 protruding inward in the vehicle width direction from the side surface 513 of the trailing arm 51, and a support 58 that is joined to the trailing arm 51 and supports an inner end 571 of the shaft 57 in the vehicle width direction. The first end 551 of the shock absorber 55 is attached to the trailing arm 51 via the shaft 57.

Figure 7:
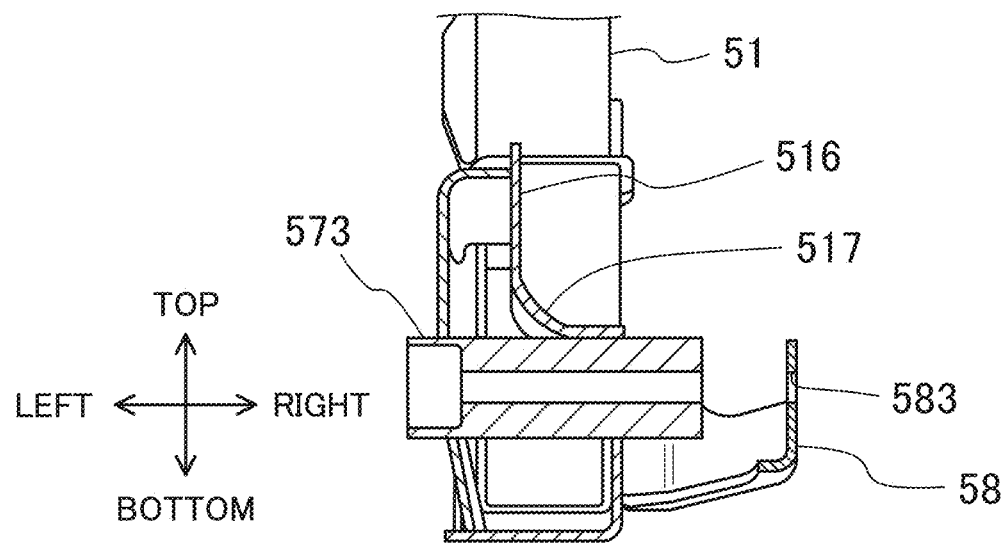
FIG. 7 is a cross-sectional view taken along line A-A in FIG. 6.

As shown in FIGS. 5 and 6, a proximal end of the shaft 57 is supported by a socket 573 attached to the trailing arm 51. An end 571 of the shaft 57 is a protruding end of the shaft 57 protruding from the socket 573. The end 571 of the shaft 57 is inserted in a through hole 583 of the support 58 as shown in FIG. 7 described later, and is fastened with a nut 574. That is, the shaft 57 is a fixed-fixed shaft. Thus, the shaft 57 improves in strength.

The support 58 is a plate extending substantially in the front-rear direction as shown in FIG. 5. The support 58 has a first end 581 and a second end 582, which are front and rear ends, joined to the side surface 513 of the trailing arm 51. That is, the support 58 is a fixed-fixed plate. Thus, the support 58 improves in strength. The first end 551 of the shock absorber 55 is connected to the fixed-fixed shaft 57 supported by the fixed-fixed support 58. This allows the shock absorber 55 to be firmly attached to the side surface 513 of the trailing arm 51.

The trailing arm 51 has a recess 516 that is formed on the side surface 513 and indented outward in the vehicle width direction. The recess 516 opens inward in the vehicle width direction and upward as shown in FIG. 5, for example. That is, the recess 516 opens on the side surface 513 and on a top surface 514 of the trailing arm 51. The first end 551 of the shock absorber 55 is arranged in the recess 516 and attached to the trailing arm 51.

Thus, with the first end 551 arranged in the recess 516 and attached to the trailing arm 51, the shock absorber 55 can be sufficiently kept from interfering with a device or component located inward of the trailing arm 51 in the vehicle width direction. In this example, the shock absorber 55 can be sufficiently kept from interfering with the engine 3 located inward of the trailing arm 51 in the vehicle width direction as shown in FIG. 4, for example. This can keep the shock absorber 55 and the engine 3 from interfering with each other without increasing the width of the utility vehicle IM.

Figure 8:
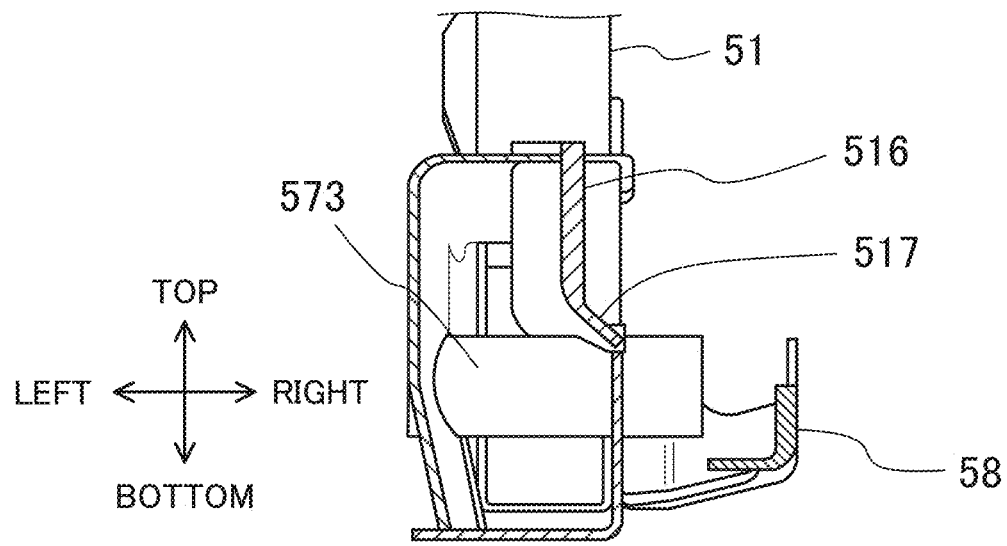
FIG. 8 is a cross-sectional view taken along line B-B in FIG. 6.

FIG. 7 is a cross-sectional view taken along line A-A in FIG. 6. FIG. 8 is a cross-sectional view taken along line B-B in FIG. 6. The trailing arm 51 has a bottom surface 517 that defines a lower end of the recess 516. The bottom surface 517 extends downward toward the inside in the vehicle width direction as shown in FIGS. 7 and 8. The bottom surface 517 of the recess 516 that inclines downward toward the inside in the vehicle width direction, i.e., toward the side surface 513, keeps gravel and mud from accumulating in the recess 516.

In this example, as shown in FIG. 2, the first end 551 of the shock absorber 55 is in a position corresponding with the rear wheel 11b in the front-rear direction of the vehicle. The "corresponding" position means that the first end 551 is positioned between front and rear ends of the rear wheel 11b, irrespective of its position in the vehicle width direction. This can make the shock absorber 55 longer than when attached to a side surface of the trailing arm 51 facing outside in the vehicle width direction, for example. Specifically, although it is difficult to place the first end 551 in a position corresponding with the rear wheel 11b in the front-rear direction of the vehicle when the first end 551 is attached to the side surface of the trailing arm 51 facing outside in the vehicle width direction, the present disclosure allows the first end 551 to be in the corresponding position. The present disclosure makes it possible to shift the position of the first end 551 as rearward as possible on the trailing arm 51. Thus, the shock absorber 55 can be made longer by the amount of the shift. The lengthened shock absorber 55 allows fine adjustment of damping.

As shown in FIG. 3, the suspension 5 further includes a cover 59 that is arranged on the trailing arm 51 and covers the first end 551 of the shock absorber 55 from below. The cover 59 is in the shape of a slightly shallow container, and is attached to a lower surface 515 of the trailing arm 51 from below. This configuration keeps the first end 551, in particular, from making contact with an obstacle below. This configuration also keeps the nut 574 from making contact with an obstacle. The cover 59 has an opening 59a. This can keep mud and others from accumulating in the cover 59.

As described above, the suspension 5 includes the trailing arm 51 that is swingably attached to the vehicle frame 2 of the utility vehicle 100 and carries the wheel 11, and the shock absorber 55 that connects the trailing arm 51 and the vehicle frame 2. The first end 551, which is an end of the shock absorber 55, is attached to the side surface 513 of the trailing arm 51 facing inside in the vehicle width direction.

The utility vehicle 100 includes the vehicle frame 2, the wheel 11, the trailing arm 51 that is swingably attached to the vehicle frame 2 and carries the wheel 11, and the shock absorber 55 that connects the side surface 513 of the trailing arm 51 facing inside in the vehicle width direction and the vehicle frame 2.

In this configuration, the first end 551 of the shock absorber 55 is attached to the side surface 513 of the trailing arm 51 facing inside in the vehicle width direction. This can make the shock absorber 55 less contact with an obstacle than, for example, when the shock absorber 55 is attached to the side surface of the trailing arm 51 facing outside in the vehicle width direction or the top surface of the trailing arm 51.

With the first end 551 of the shock absorber 55 attached to the side surface 513 of the trailing arm 51 facing inside in the vehicle width direction, the shock absorber 55 can be made longer than when attached to the top surface of the trailing arm 51, for example. This allows fine adjustment of damping by the shock absorber 55. The lengthened shock absorber 55 can make the spring 56 longer. This can make the spring 56 less elastic, lowering the strength of the connections of the first and second ends 551 and 552 of the shock absorber 55.

The trailing arm 51 has the recess 516 that is formed on the side surface 513 and indented outward in the vehicle width direction. The recess 516 opens inward in the vehicle width direction and upward. The first end 551 of the shock absorber 55 is arranged in the recess 516 and attached to the trailing arm 51.

This configuration can sufficiently keep the shock absorber 55 and the engine 3 located inward of the trailing arm 51 in the vehicle width direction from interfering with each other. Thus, there is no need to increase the width of the utility vehicle 100 uselessly.

The trailing arm 51 has the bottom surface 517 that defines the lower end of the recess 516. The bottom surface 517 extends downward toward the inside in the vehicle width direction.

The bottom surface 517 of the recess 516 that inclines downward toward the inside in the vehicle width direction keeps gravel and mud from accumulating in the recess 516.

The first end 551 of the shock absorber 55 is in a position corresponding with the rear wheel 11 in the front-rear direction of the vehicle.

This can make the shock absorber 55 longer than when the first end 551 is attached to the side surface of the trailing arm 51 facing outside in the vehicle width direction. This can shift the connection of the first end 551 to the trailing arm 51 as rearward as possible, making the shock absorber 55 longer by the amount of the shift. Thus, finer adjustment of damping can be achieved.

The suspension 5 further includes the shaft 57 protruding inward in the vehicle width direction from the side surface 513 of the trailing arm 51, and the support 58 that is joined to the trailing arm 51 and supports the inner end 571 of the shaft 57 in the vehicle width direction. The first end 551 of the shock absorber 55 is attached to the trailing arm 51 via the shaft 57.

This configuration allows the first end 551 of the shock absorber 55 to be attached to the trailing arm 51 via the fixed-fixed shaft 57. Thus, the shock absorber 55 can be firmly attached to the side surface 513 of the trailing arm 51.

The suspension 5 further includes the cover 59 that is arranged on the trailing arm 51 and covers the first end 551 of the shock absorber 55 from below.

This configuration allows the cover 59 to keep the first end 551 from making contact with an obstacle below.

Other Embodiments

The embodiment has been described above as an example of the technique disclosed in the present application. However, the present disclosure is not limited to this exemplary embodiment, but is also applicable to other embodiments which are altered or substituted, to which other features are added, or from which some features are omitted, as needed. The components described in the embodiment may be combined to create a new embodiment. The components illustrated on the accompanying drawings and described in the detailed description include not only essential components that need to be used to overcome the problem, but also other unessential components that do not have to be used to overcome the problem. Therefore, such unessential components should not be taken for essential ones, simply because such unessential components are illustrated in the drawings or mentioned in the detailed description.

The present disclosure can also be applied to suspensions that independently suspend the left and right front wheels 11a.

The off-road vehicle is not limited to the utility vehicle 100, and may be an all-terrain vehicle (ATV) or a tractor. The utility vehicle 100 may have any number of wheels. For example, the utility vehicle 100 may be a three-wheeled vehicle.

The utility vehicle 100 may have any number of seats 17. For example, the utility vehicle 100 may only have a single front seat and a single rear seat.

The size, shape, and material of the body 1, the vehicle frame 2, the engine 3, the suspensions 5, and the stabilizer bar 6 are not limited.

The trailing arm 51 may have no recess 516 when the shock absorber 55 and the engine 3 are sufficiently kept from interfering with each other.

For example, the bottom surface 517 of the recess 516 may be a horizontal surface when, for example, mud and others are less likely to accumulate in the recess 516.

The first end 551 of the shock absorber 55 may not be in a position corresponding with the rear wheel 11b in the front-rear direction of the vehicle. Specifically, the first end 551 may be located forward of the front end of the rear wheel 11b in the front-rear direction of the vehicle.

The support 58 may be omitted. Specifically, the end 571 of the shaft 57 may be a free end if the shaft 57 has a sufficient strength.

The cover 59 may have no opening 59a, or the cover 59 itself may be omitted.

What is claimed is:
1. A suspension, comprising:
   a trailing arm that is swingably attached to a vehicle frame of an off-road vehicle and carries a wheel; and
   a shock absorber that connects the trailing arm and the vehicle frame,
   wherein:
   the trailing arm includes an inner side surface which is a surface of the trailing arm that is most adjacent to a center of the vehicle,
   a first end of the shock absorber is attached to the inner side surface of the trailing arm,
   the trailing arm includes a recess formed on the inner side surface and indented outward in a width direction of the vehicle from the inner side surface,
   the recess opens inward in the width direction of the vehicle and upward, and
   the first end of the shock absorber is arranged in the recess and attached to the trailing arm.
2. The suspension of claim 1, wherein:
   the trailing arm has a bottom surface that defines a lower end of the recess, and the bottom surface extends downward toward the inner side surface in the width direction of the vehicle.

3. The suspension of claim 1, wherein:
the first end of the shock absorber is in a position corresponding with the wheel in a front-rear direction of the vehicle.

4. The suspension of claim 1, further comprising:
a shaft protruding inward in a width direction of the vehicle from the inner side surface of the trailing arm, a portion of the shaft extends into the trailing arm; and
a support that is joined to the trailing arm and supports an inner end of the shaft in the width direction of the vehicle,
wherein the first end of the shock absorber is attached to the trailing arm via the shaft.

5. The suspension of claim 1, further comprising:
a cover on the trailing arm that covers the first end of the shock absorber from below.

6. An off-road vehicle, comprising:
a vehicle frame;
a wheel;
a trailing arm that is swingably attached to the vehicle frame and carries the wheel; and
a shock absorber that connects the trailing arm and the vehicle frame,
wherein:
the trailing arm includes an inner side surface which is a surface of the trailing arm that is most adjacent to a center of the vehicle, and
a first end of the shock absorber is attached to the inner side surface of the trailing arm,
the trailing arm includes a recess formed on the inner side surface and indented outward in a width direction of the vehicle from the inner side surface,
the recess opens inward in the width direction of the vehicle and upward, and
the first end of the shock absorber is arranged in the recess and attached to the trailing arm.

7. The off-road vehicle of claim 6, wherein:
the trailing arm has a bottom surface that defines a lower end of the recess, and
the bottom surface extends downward toward the inner side surface in the width direction of the vehicle.

8. The off-road vehicle of claim 6, wherein:
the first end of the shock absorber is in a position corresponding with the wheel in a front-rear direction of the vehicle.

9. The off-road vehicle of claim 6, further comprising:
a shaft protruding inward in a width direction of the vehicle from the inner side surface of the trailing arm, a portion of the shaft extends into the trailing arm; and
a support that is joined to the trailing arm and supports an inner end of the shaft in the width direction of the vehicle,
wherein the first end of the shock absorber is attached to the trailing arm via the shaft.

10. The off-road vehicle of claim 6, further comprising:
a cover on the trailing arm that covers the first end of the shock absorber from below.

* * * * *